United States Patent
Yi (10) Patent No.: US 7,693,430 B2
(45) Date of Patent: *Apr. 6, 2010

(54) BURST OPTICAL RECEIVER WITH AC COUPLING AND INTEGRATOR FEEDBACK NETWORK

(76) Inventor: Heqing Yi, No.16 Building. 439#. Chunxiao Road, Zhangjiang Hi-tech Zone, Shanghai 201203 (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,981

(22) Filed: Dec. 17, 2008

(65) Prior Publication Data

US 2009/0103932 A1  Apr. 23, 2009

Related U.S. Application Data

(63) Continuation of application No. 11/123,917, filed on May 6, 2005.

(51) Int. Cl.
*H04B 10/06* (2006.01)
(52) U.S. Cl. .................. 398/209; 398/202; 398/208
(58) Field of Classification Search ......... 398/158–160, 398/202–214
See application file for complete search history.

(56) References Cited

U.S. PATENT DOCUMENTS

| | | | | |
|---|---|---|---|---|
| 5,023,942 A | * | 6/1991 | Goepel | ................ 398/173 |
| 5,373,388 A | * | 12/1994 | Betts | ................ 398/202 |
| 5,430,765 A | * | 7/1995 | Nagahori | ................ 375/318 |
| 6,963,696 B1 | * | 11/2005 | Bowler et al. | ................ 398/202 |
| 2002/0027689 A1 | * | 3/2002 | Bartur et al. | ................ 359/152 |
| 2004/0075484 A1 | * | 4/2004 | Nishizono et al. | ................ 327/345 |

* cited by examiner

*Primary Examiner*—Ken N Vanderpuye
*Assistant Examiner*—Li Liu
(74) *Attorney, Agent, or Firm*—Raymond Y. Chan; David and Raymond Patent Firm (57) ABSTRACT

A burst optical receiver includes an optical signal inlet, an optical-electrical signal converter, an AC coupling network, an integrator feedback network, and an electrical signal outlet. The AC coupling network is electrically communicated with the optical-electrical signal converter, and blocks the electric signal having the frequency ranges lower than a predetermined threshold frequency, and allows the electric signal having the frequency ranges above the threshold frequency to pass through. The integrator feedback network is electrically communicated with the AC coupling network, and recurrently modifies the electric signal from the AC coupling network in such a manner to minimize noise mixed with the electric signal such that the electric signal is sufficiently contrasted with the noise for maximizing a signal-to-noise ratio of the electric signal.

10 Claims, 5 Drawing Sheets

BURST OPTICAL RECEIVER WITH AC COUPLING AND INTEGRATOR FEEDBACK NETWORK

CROSS REFERENCE OF RELATED APPLICATION

This is a Continuation application that claims the benefit of priority under 35 U.S.C. §119 to a non-provisional application, application Ser. No. 11/123,917, filed May 6, 2005.

BACKGROUND OF THE PRESENT INVENTION

1. Field of Invention

The present invention relates to a coupling network, and more particularly to an AC coupling integrating network for a burst optical receiver which is adapted to enhance the sensitivity thereof as compared with conventional AC coupling networks in conventional optical receivers.

2. Description of Related Arts

With the development of information technology, the utilization of optical fibers for the purpose of data transmission has become extremely popular. For example, data transmission for the purpose of internet connection has been one of the major applications of optical fibers. Other applications include telephone signal transmissions as well as cable broadcast.

No matter which particular form of application the optical fibers are utilized, a typical optical signal transmission system is faster than a traditional cable transmission system or a DSL transmission system, wherein the PON (Passive Optical Network), which has been widely considered as the next generation superstar in the communication business, is adapted with point-to-multi-point technology with bi-directional structure instead of the traditional point-to-point inefficient network, which means the single OLT (Optical Line Terminal) broadcasts the data on the single optical cable through a splitter to the multiple ONUs (Optical Network Unit) to complete the download process while the multiple ONUs upload the data to the OLT on the single optical cable to complete the upload process.

The goal of FTTH (Fiber to the Home) is therefore procurable by minimizing the cost of the infrastructure of the optical fiber network and offering a reasonable price for general public usage. In order to implement the bi-directional PON, the WDM (Wavelength Division Multiplexing) for the download process and the TDM (Time Division Multiplexing) for the upload process emerge as the breakthrough technology for exploiting the capacity of the optical fiber, wherein the TDM facilitates different time slots for each ONU user to upload data to the OLT on the same optical fiber and consequently the total number of ONU on the same cable is limited by the duration of each time slot, which theoretically the infinitesimal duration of each time slot achieves maximum total number of time slot to increase the data throughput.

The burst mode transceiver is employed in minimizing the duration of each time slot, wherein the burst mode transmitter transmits optical signals in burst form which is received by the burst mode optical receiver via the optical fibers. The burst mode optical receiver is adapted to convert burst optical signal to a suitable electric signal and transmit the electric signal to the relevant application terminal.

Thus, one may appreciate that the extent to which the application terminal is capable of performing optimally would largely depend upon the quality of the electric signal as converted by the burst optical receiver. However, as a matter of fact, when the burst mode optical signal is transmitted via the optical fibers, there exist considerable amount of noise interfering with the optical signal so as to affect the conversion of the optical signal to the electric signal. For example, the DC offset problem; jittering and distortion; the SNR (Signal to Noise Ratio) where the amplitude of noise is comparable with the optical signal which is to be transmitted, the optical receiver is difficult to recognize so that the resulting converted electric signal may simply be different from the electric signal which would have been correctly converted.

A difficult scenario for those skilled in the art is that in order to achieve a satisfactory electric signal, the extinction ratio of the optical signal needs to be high such that the effect of interference from the noise for the purpose of signal conversion can be minimized. Though this may bring a satisfactory solution from the viewpoint of signal conversion, an increase of extinction ratio can cause other problems. For instances, setting the extinction ratio too high may overload the entire circuitry of the optical receiver as well as the optical fibers so as to reduce the general lifespan of the relevant electrical components. However, a lower extinction ratio may blur the distinction between noise and the optical signal so that the burst optical receiver is incapable of properly convert the optical signal into a desirable electric signal.

As an attempt to balance the above conflicting technical requirements, conventional burst optical receivers are usually low in sensitivity and speed. For example, the sensitivity of a conventional optical receiver is usually in the range of −29 dBm at 155 Mb/sec, which should have been increased for enhancing the terminal applications.

SUMMARY OF THE PRESENT INVENTION

A main object of the present invention is to provide a burst optical receiver incorporating with an AC coupling network and an integrator feedback network which are capable of enhancing a sensitivity of the burst optical receiver as compared with conventional burst optical receivers.

Another object of the present invention is to provide a burst optical receiver incorporating an AC coupling network and an integrator feedback network which are adapted to mitigate the requirement of high extinction ratio and signal-to-noise ratio in a conventional burst optical fiber signal transmission network without significantly inducing unnecessary burdens to the optical fiber transmission system as a whole.

Another object of the present invention is to provide a burst optical receiver incorporating with an AC coupling network and an integrator feedback network, which do not involve any complicated electronic components to achieve rapid processing speed and reduce the manufacturing and maintenance cost of the present invention.

Another object of the present invention is to provide a burst optical receiver which supports complementary output for fitting into a wide variety of applications of the present invention.

Accordingly, in order to accomplish the above objects, the present invention provides a burst optical receiver, comprising:

an optical signal inlet adapted for receiving a burst optical signal;

an optical-electrical signal converter electrically communicated with the optical signal inlet to transform the burst optical signal into an electric signal which is composed of a plurality of frequency ranges;

an AC coupling network which is electrically communicated with the optical-electrical signal converter, and blocks the electric signal having the frequency ranges lower than a predetermined threshold frequency, and allows the electric signal having the frequency ranges above the threshold frequency to pass through;

an integrator feedback network which is electrically communicated with the AC coupling network, and recurrently modifies the electric signal from the AC coupling network in such a manner to minimize noise mixed with the electric signal such that the electric signal is sufficiently contrasted with the noise for maximizing a signal-to-noise ratio of the electric signal; and an electric signal outlet which is electrically connected with the integrator feedback network for outputting the electric signal.

These and other objectives, features, and advantages of the present invention will become apparent from the following detailed description, the accompanying drawings, and the appended claims.

DETAILED DESCRIPTION OF THE PREFERRED EMBODIMENT

Figure 1:
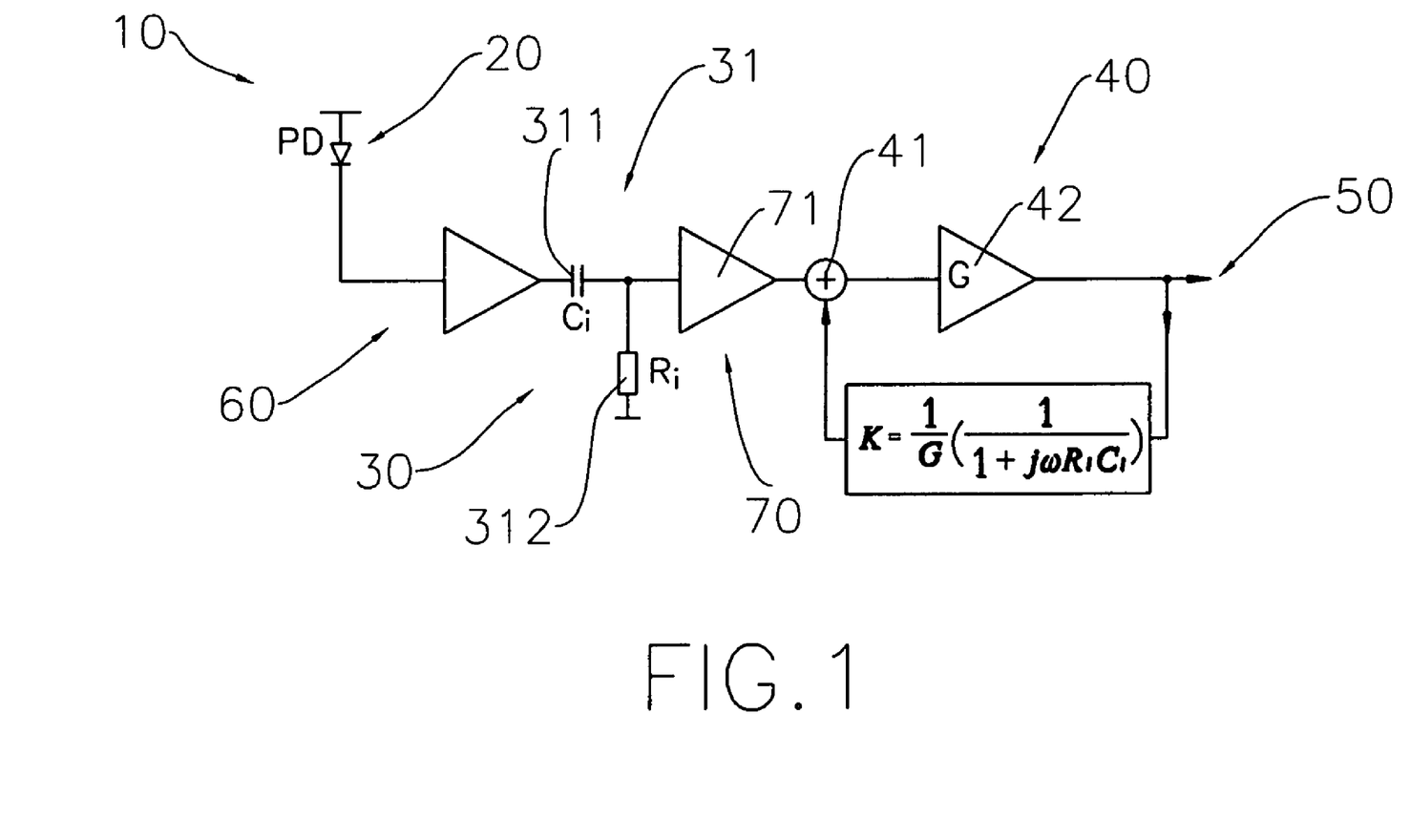
FIG. 1 is a schematic diagram of a burst optical receiver according to a first preferred embodiment of the present invention.
Figure 2:
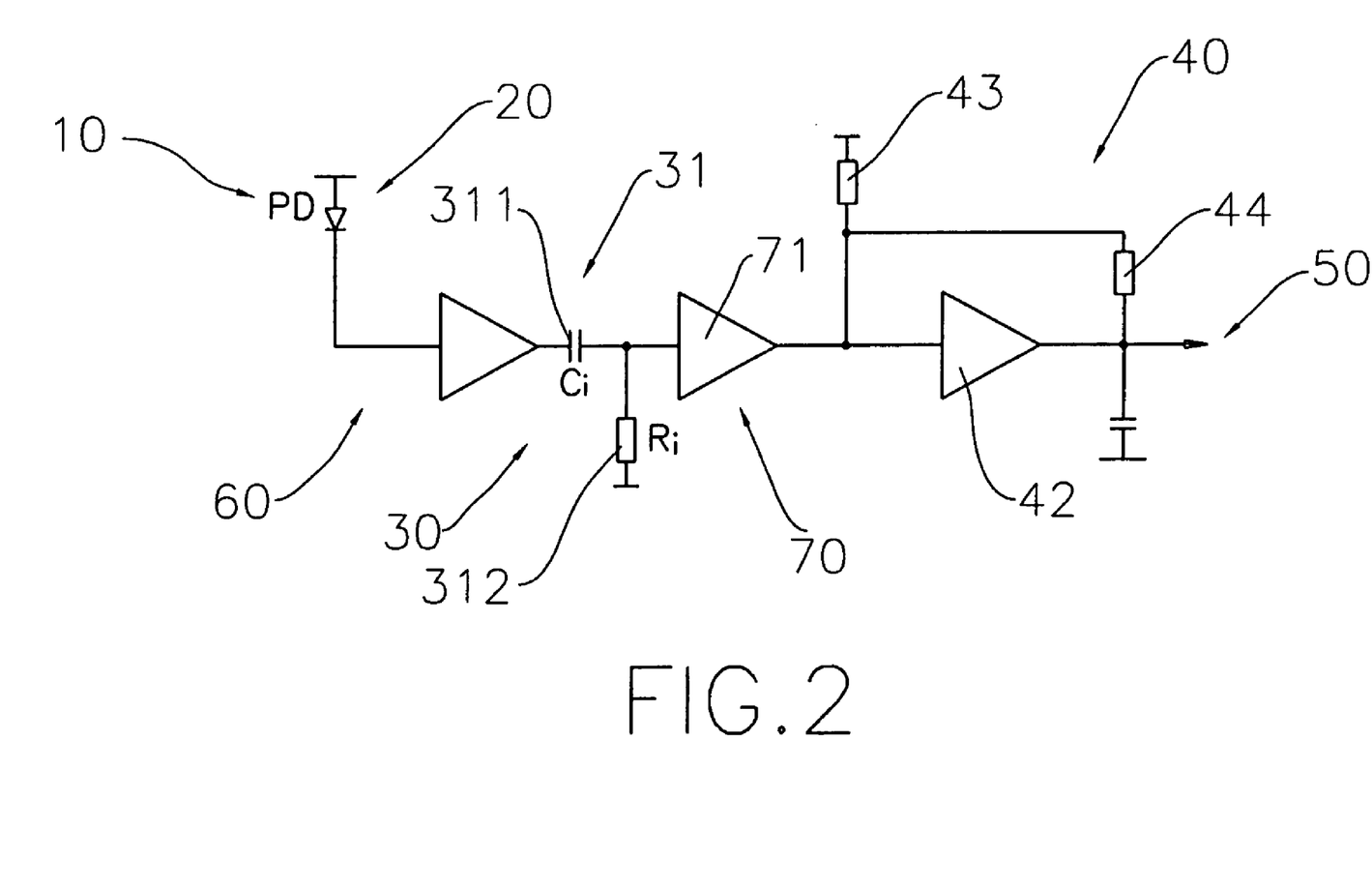
FIG. 2 is a circuit diagram of the burst optical receiver according to the above first preferred embodiment of the present invention.

Referring to FIG. 1 and FIG. 2 of the drawings, a burst optical receiver according to a first preferred embodiment of the present invention is illustrated, in which the burst optical receiver comprises an optical signal inlet 10, an optical-electrical signal converter 20, an AC coupling network 30, an integrator feedback network 40, and an electric signal outlet 50.

The burst optical receiver is embodied to receive burst optical signal, usually transmitted via optical fibers, used for carrying information. The optical signal inlet 10 is adapted for receiving a burst optical signal for feeding into the optical-electrical signal converter 20, the AC coupling network 30, and the integrator feedback network 40.

The optical-electrical signal converter 20 is electrically communicated with the optical signal inlet 10 to transform the burst optical signal into an electric signal which composes of a plurality of frequency ranges. Specifically, the optical-electrical signal converter 20 is preferably embodied as a photodiode which is adapted to receive and convert optical signal as transmitted from the optical fibers into predetermined electrical signal by internal photoelectric effect. For example, the photodiode can be a Positive-Intrinsic-Negative photodiode (PIN PD), or an avalanche photodiode (APD).

The AC coupling network 30 is electrically communicated with the optical-electrical signal converter 20, and blocks the electric signal having the frequency ranges lower than a predetermined threshold frequency, and allows the electric signal having the frequency ranges above the threshold frequency to pass through the AC coupling network 30.

The integrator feedback network 40 is electrically communicated with the AC coupling network 30, and recurrently modifies the electric signal from the AC coupling network 30 in such a manner to minimize noise mixed with the electric signal such that the electric signal is sufficiently contrasted with the noise for maximizing a signal-to-noise ratio of the electric signal.

The electric signal outlet 50 is electrically connected with the integrator feedback network 40 for outputting the electric signal which has been modified by the integrator feedback network 40.

Referring to FIG. 1 of the drawings, the burst optical receiver further comprises a pre-amplifying network 60 electrically connecting between the optical-electrical signal converter 20 and the AC coupling network 30. The pre-amplifying network 60, which is embodied as a typical pre-amplifier, is adapted to amplify the electric signal, as well as noise, as converted from the optical-electrical signal converter 20 to a predetermined current level for AC coupling of the electric signal.

The preamplifier is to offer a low input impedance to assure effective passing of electric signal flowing through the pre-amplifier, wherein the electric signal is then amplified in micro amplitude scale or milli amplitude scale so as to provide sufficient driving capacity on the possible variant loading connected to the pre-amplifying network 60.

Moreover, in order to ensure stable electric input into the integrator feedback network 40, according to the first preferred embodiment of the present invention, the optical receiver further comprises a buffer amplifying network 70 electrically connecting between the AC coupling network 30 and the integrator feedback network 40, wherein the buffer amplifying network 70 is adapted to stabilize the electric signal which is to be fed into the integrator feedback network 40.

The buffer amplifying network 70 is preferably embodied as a typical buffer amplifier 71 which is electrically connected between the AC coupling network 30 and the integrator feedback network 40, and serves the function of buffering by offering a high input impedance and a low output impedance.

According to the first preferred embodiment of the present invention, the AC coupling network 30 comprises a high pass single-time-constant (STC) circuitry 31 electrically connecting between the pre-amplifying network 60 and the buffer amplifying network 70. Referring to FIG. 2 of the drawings, the high pass STC circuitry 31 comprises a STC capacitor 311 electrically connected in series between the pre-amplifying network 60 and the integrator feedback network 40, and a resistor 312 electrically connected between the STC capacitor 311 and a ground terminal of the burst optical receiver.

The high pass STC circuitry 31 is meant to construct AC coupling of the inputted electric signal from the pre-amplifying network 60, so as to significantly reduce an extinction ratio requirement for input. In other words, in order to avoid the difficulties encountered by conventional burst optical receiver, the extinction ratio requirement of the optical signal needs not be significantly raised if the optical receiver of the present invention is effectively utilized.

It is worth mentioning that the high pass STC circuitry 31 has a transfer function of:

$$H(\omega)_1 = 1/(1 + 1/J\omega R_i C_i)$$

Moreover, the transfer function of the integrator feedback network 40 is given by:

$$H(\omega)_2 = G/(1-KG) = G(1+1/J\omega R_iC_i)$$

The transfer function between the pre-amplifier 60 and the output 50 is given by:

$$H(\omega)_3 = H(\omega)_1 \cdot H(\omega)_2 = \{1/[1+1/(J\omega R_iC_i)]\} \cdot [1+1/(J\omega R_iC_i)] = G,$$

where the G is the gain of the integrator amplifier 42 in the integrator feedback network 40.

Rewritten Paragraph:

Thus the transfer function $H(\omega)_1$ of the high pass STC circuitry 31 indicates the possibility of passing all the high frequency noise through the high pass STC circuitry 31. However, the transfer function of the product of $H(\omega)_1$ and $H(\omega)_2$ clearly eliminate the factor $(1+1/(JwR_iC_i)$ which leads to the result of canceling the effect of high pass at the output $S_{out}$ after the signals pass through the integrator feedback network 40.

Referring to FIG. 1 of the drawings, the integrator feedback network 40 comprises a feedback adder 41 and an 42 electrically connecting between the buffer amplifying network 70 and the electric signal outlet 50, wherein the feedback adder 41 is adapted to sum up the output of the buffer amplifying network 70 and an output of the integrator amplifier 42 to constitute a feedback input which is then fed into the integrator amplifier 42 again.

Referring to FIG. 1 and FIG. 2 of the drawings, the feedback adder 41 is preferably embodied as comprising first and second feedback resistors 43, 44 connecting with an input and output of the integrator amplifier 42 for creating the transfer function of the integrator feedback network 40 so as to stabilize the integrator feedback network 40 and a self-excitement thereof. Thus, careful selection of the values the resistances of the first and second feedback resistors 43, 44 is inevitably required. According to the preferred embodiment, the resistance of the first and second feedback resistors 43, 44 should be determined such that:

$$R_{43}/(R_{43}+R_{44}) \leq 1/G$$

It is worth mentioning that upon careful selection to make the absolute value of the loop gain $A(s) \times \beta(s)$ less than or equal to one, the integrator feedback network 40 sustains to be stable, therefore unlikely to be self-excited.

From the above descriptions, it can be expected the burst optical receiver of the present invention significantly increases the signal-to-noise (SNR) ratio of the electric signal, maintains the same unit-gain bandwidth despite the closed-loop gain decrease due to the passive elements in the integrator feedback network 40. Moreover, the sensitivity of the burst optical receiver is expected to increase to −40 dBm at the transmitting rate of 155 Mbit/sec, and even to the extent of Giga bit per second scale.

Figure 3:
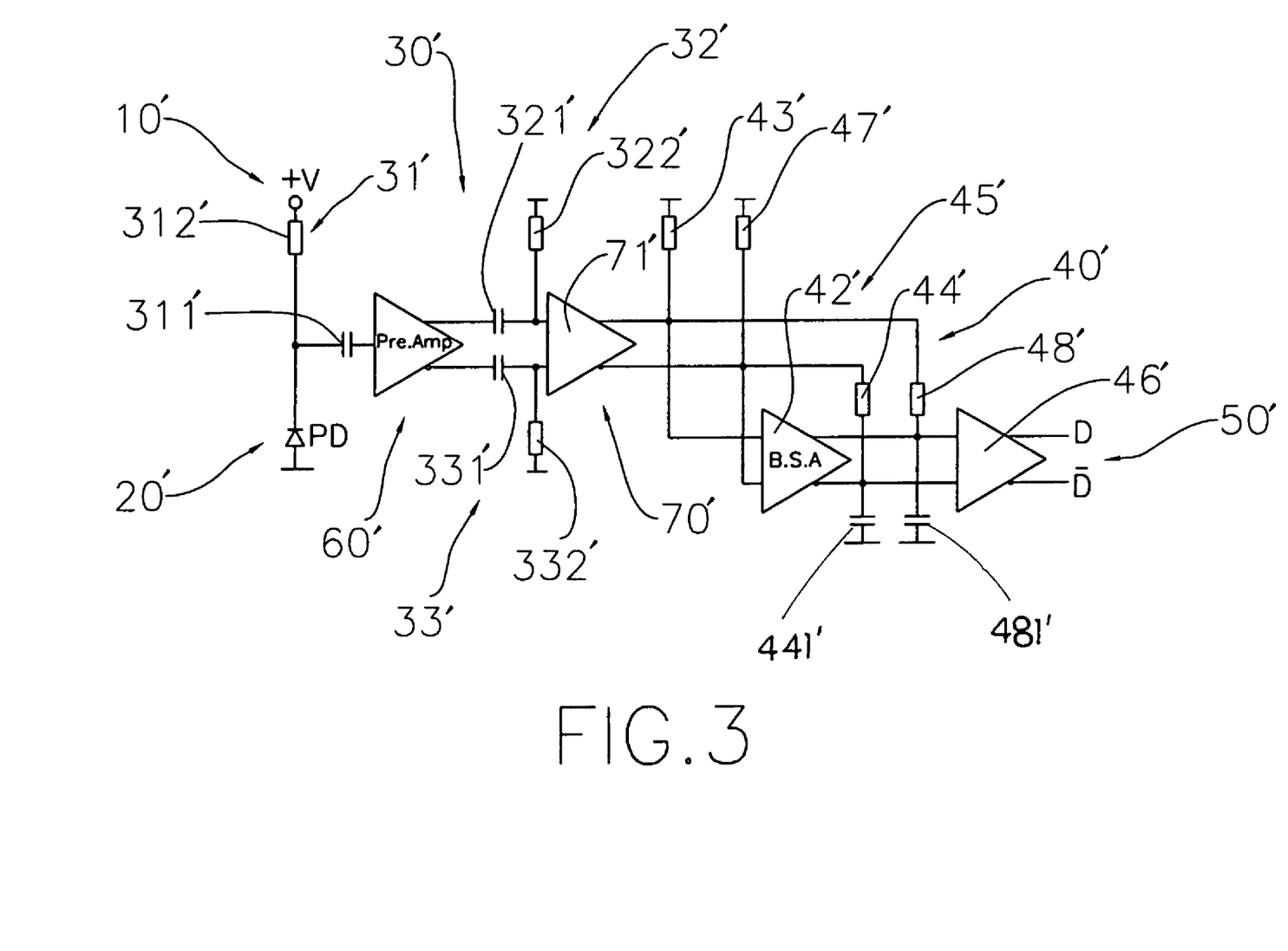
FIG. 3 is a circuit diagram of a burst optical receiver according to a second preferred embodiment of the present invention.

Referring to FIG. 3 of the drawings, a burst optical receiver according to a second preferred embodiment of the present invention is illustrated, wherein the burst optical receiver comprises an optical signal inlet 10', an optical-electrical signal converter 20', an AC coupling network 30', an integrator feedback network 40', and an electric signal outlet 50'.

The burst optical receiver is embodied to receive burst optical signal, usually transmitted via optical fibers, used for carrying information. The optical signal inlet 10' is adapted to receive a series of burst optical signals via the optical fiber for feeding into the optical-electrical signal converter 20'.

As in the first preferred embodiment, the optical-electrical signal converter 20' is electrically connected with the optical signal inlet 10' to transform the burst optical signal into an electric signal which composes of a plurality of frequency ranges. Specifically, the optical-electrical signal converter 20' is preferably embodied as a photodiode which is adapted to receive and convert optical signals as transmitted from the optical fibers into predetermined electrical signals by internal photoelectric effect. For example, the photodiode can be a Positive-Intrinsic-Negative photodiode (PIN PD), or an avalanche photodiode (APD).

The AC coupling network 30' is electrically communicated with the optical-electrical signal converter 20', and blocks the electric signal having the frequency ranges lower than a predetermined threshold frequency, and allows the electric signal having the frequency ranges above the threshold frequency to pass through the AC coupling network 30'.

The integrator feedback network 40' is electrically communicated with the AC coupling network 30', and recurrently modifies the electric signal from the AC coupling network 30' in such a manner to minimize noise mixed with the electric signal such that the electric signal is sufficiently contrasted with the noise for maximizing a signal-to-noise ratio of the electric signal.

The electric signal outlet 50' is electrically connected with the integrator feedback network 40' for outputting the electric signal which has been modified by the integrator feedback network 40'.

Referring to FIG. 3 of the drawings, the burst optical receiver further comprises a pre-amplifying network 60' electrically connecting between the optical-electrical signal converter 20' and the AC coupling network 30'. The pre-amplifying network 60', which is embodied as a typical signal pre-amplifier, is adapted to amplify the electric signal, as well as noise, as converted from the optical-electrical signal converter 20' to a predetermined current level for AC coupling of the electric signal.

The signal preamplifier is to offer a low input impedance to assure effective passing of electric signal flowing through the pre-amplifier, wherein the electric signal is then amplified in micro amplitude scale or milli amplitude scale so as to provide sufficient driving capacity on the possible various loading which is connected to the pre-amplifying network 60'.

According to the second preferred embodiment of the present invention, the pre-amplifier of the pre-amplifying circuitry 60' has a positive signal output and a complementary signal output in which the electric signal outputted therefrom is a compliment (in reverse phase) of the positive signal output.

Moreover, in order to ensure stable electric input into the integrator feedback network 40', according to the second preferred embodiment of the present invention, the optical receiver further comprises a buffer amplifying network 70' electrically connecting between the AC coupling network 30' and the integrator feedback network 40', wherein the buffer amplifying network 70' is adapted to stabilize the electric signal which is to be fed into the integrator feedback network 40'.

The buffer amplifying network 70' is preferably embodied as a typical buffer amplifier 71' which is electrically connected between the AC coupling network 30' and the integrator feedback network 40', and serves the function of buffering by offering a high input impedance and a low output impedance. According to the second preferred embodiment of the present invention, the buffer amplifier 71' has a positive signal output and a complementary signal output in which the electric signal outputted therefrom is in reverse phase of that of the positive signal output.

According to the second preferred embodiment of the present invention, the AC coupling network 30' comprises first, second, and third high pass single-time-constant (STC) circuitries 31' 32' 33', wherein the first high pass single-time-constant (STC) circuitry 31' is electrically to the optical-electrical signal converter 20' and the pre-amplifying network 60', and adapted to perform AC-coupling before the electric signal is fed into the pre-amplifying network 60'.

Referring to FIG. 3 of the drawings, the second high pass STC circuitry 32' is electrically connecting between the pre-amplifying network 60' and the buffer amplifying network 70' through the positive signal output of the pre-amplifier, whereas the third high pass STC circuitry 33' is electrically connecting between the pre-amplifying network 60' and the buffer amplifying network 70' through the complementary signal output of the pre-amplifier.

Specifically, the first high pass STC circuitry 31' comprises a first STC capacitor 311' electrically connected between the optical-electrical signal converter 20' and the pre-amplifying network 60', and a first resistor 312' electrically connected between the STC capacitor 311' and the power terminal.

As a result, DC components of the input electric signal will pass through the first resistor 312' and the AC component of the input electric signals will pass through the first STC capacitor 311' to the preamplifier 60' due to the relatively smaller input impedance of the preamplifier 60 as compared to the resistance of the first resistance 312'.

As regards the other two high pass STC circuitries 32', 33', the second high pass STC circuitry 32' comprises a second STC capacitor 321' electrically connected between the pre-amplifying network 60' and the buffer amplifying network 70' via the positive signal output of the pre-amplifying network 60', and a second ground resistor 322' electrically connected between the second STC capacitor 321', the buffer amplifying network 70', and a ground terminal of the burst optical receiver.

Finally the third high pass STC circuitry 33' comprises a third STC capacitor 331' electrically connected between the pre-amplifying network 60' and the buffer amplifying network 70' via the complementary signal output of the pre-amplifying network 60', and a third ground resistor 332' electrically connected between the third STC capacitor 331', the buffer amplifying network 70', and a ground terminal of the burst optical receiver.

Note that the first through third high pass STC circuitries 31', 32', 33' are meant to construct AC coupling of the inputted electric signal, so as to significantly reduce the requirement of an extinction ratio of the optical signal for fitting a wide variety of conventional optical signal transmitter which typically transmits optical signal with moderate extinction ratio. In other words, in order to avoid the difficulties encountered by conventional burst optical receiver, the extinction ratio requirement of the optical signal needs not be significantly raised if the optical receiver of the present invention is effectively utilized.

Similar to the first preferred embodiment, the high pass STC circuitries 31, 32, 33 has a transfer function of:

$H(\omega)_1 = 1/(1+1/J\omega R_i C_i)$, where Ri denotes the resistors 312', 322', or 332' and $C_i$ denotes the corresponding capacitors 311', 321', or 331', respectively.

Moreover, the transfer function of the integrator feedback network 40' is given by:

$H(\omega)_2 = G/(1-KG) = G(1+1/J\omega R_i C_i$, where Ri denotes the resistors 44', 48' while $C_i$ denotes the corresponding capacitors 441', 481', respectively.

Referring to FIG. 3 of the drawings, the integrator feedback network 40' comprises a feedback adder 41', a complementary feedback adder 45', and an integrator amplifier 42' electrically connecting between the buffer amplifying network 70' and the electric signal outlet 50', wherein the feedback adder 41' and the complementary feedback adder 45' are adapted to sum up the outputs of the buffer amplifying network 70' and the outputs of the integrator amplifier 42' to constitute feedback inputs which are then fed into the integrator amplifier 42' again.

According to the second preferred embodiment, the feedback adder 41' is embodied as comprising third and fourth feedback resistors 43', 44' connecting with a positive input and a positive output of the integrator amplifier 42' for creating a predetermined transfer function of the integrator feedback network 40' so as to stabilize the integrator feedback network 40' and a self-excitement thereof. Thus, careful selection of the values the resistances of the first and second feedback resistors 43', 44' is inevitably required. According to the preferred embodiment, the resistance of the first and second feedback resistors 43', 44' should be determined such that:

$R_{43'}/(R_{43'}+R_{44'}) \leq 1/G'$, where the G' is the gain of the integrator amplifier 42'.

Referring to FIG. 3 of the drawings, the complementary feedback adder 45' is preferably embodied as comprising a fifth and a sixth feedback resistors 47', 48' electrically with the integrator amplifier 42' in such a manner that the fifth feedback resistor 47' is electrically connected with a complementary input of the of the integrator amplifier 42', whereas the sixth feedback resistor 48' is electrically connected to a complementary output of the integrator amplifier 42'.

It is worth mentioning that upon careful selection to make the absolute value of the loop gain $A(s) \times \beta(s)$ less than or equal to one, the integrator feedback network 40' sustains to be stable, therefore unlikely to be self-excited. Moreover, careful selection of the loop gain G' also provides the function of adjusting the input optical signal level received from the optical-electrical signal converter 20' to a predetermined logic level so as to offer a standard trigger signal for the loading circuit or apparatus which is electrically connected with the burst optical receiver of the present invention.

In order to further stabilize the burst optical receiver of the present invention, the integrator feedback network 40' further comprises an auxiliary amplifier 46' electrically connecting between the integrator amplifier 42' and the electric signal outlet 50' at the positive output and the complementary output of the integrator amplifier 42' for further enhancing and stabilizing an electric output from the integrator amplifier 42'.

Figure 4:
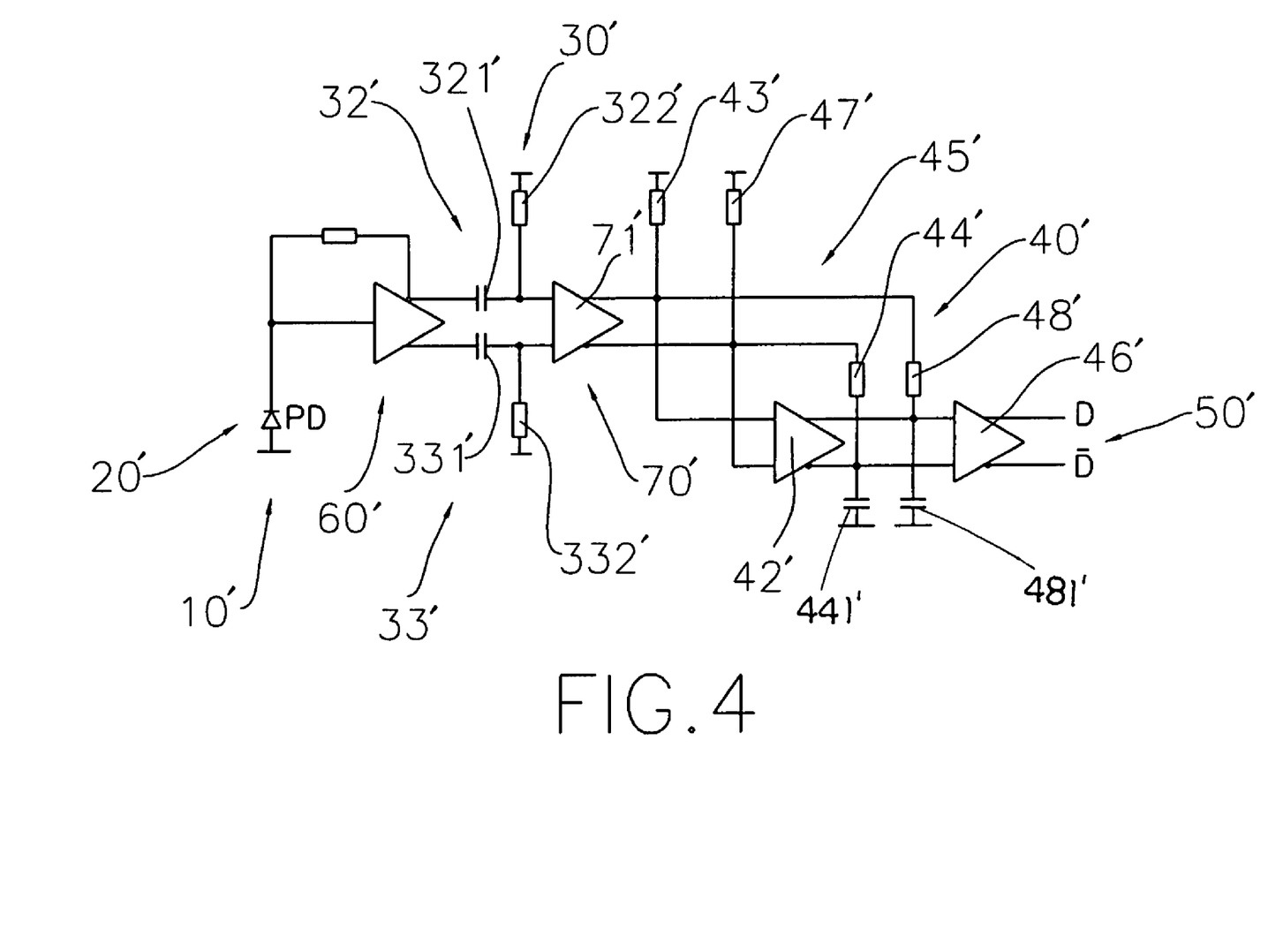
FIG. 4 is an alternative mode of the burst optical receiver according to the above second preferred embodiment of the present invention.
Figure 5A:
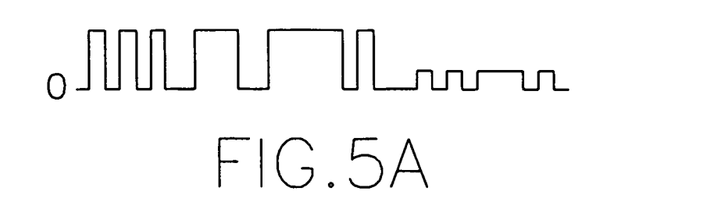
FIG. 5A to FIG. 5D are schematic diagrams of the waveforms of the output signal of the burst optical receiver according to the above second preferred embodiment of the present invention, illustrating the waveforms of electric signal at the pre-amplifying network, AC coupling network, integrator feedback network, and the auxiliary amplifier respectively.
Figure 5B:
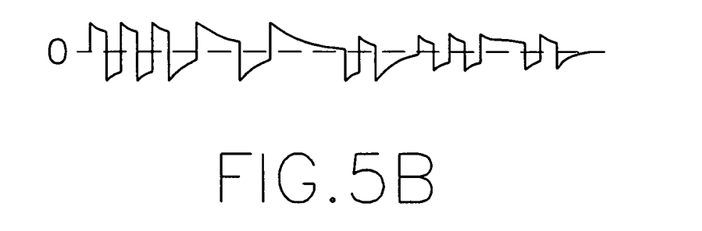
Figure 5C:
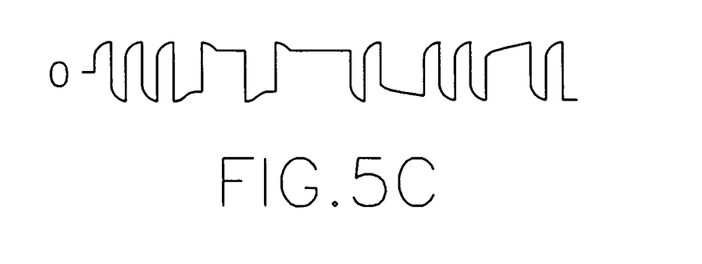
Figure 5D:
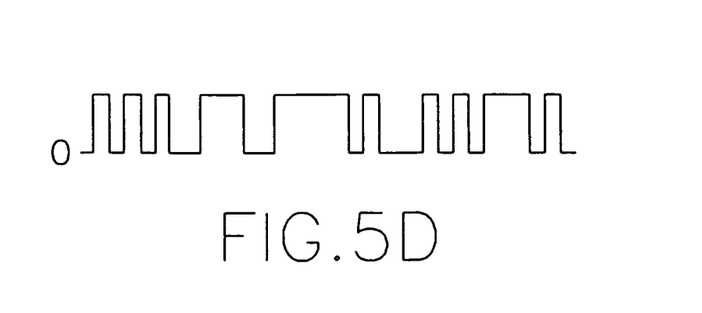

Referring to FIG. 4 of the drawing, an alternative mode of the burst optical receiver according to the second preferred embodiment of the present invention is illustrated. The alternative mode is similar to the second preferred embodiment except that electric current converted by the optical-electrical signal converter 20' is directly fed into the pre-amplifying network 60' or the AC coupling network 30', as shown in FIG. 4 of the drawings.

Referring to FIG. 5A through 5D of the drawings, the waveforms of the electric signal passing through the pre-amplifying network 60', AC coupling network 30', integrator feedback network 40', and the auxiliary amplifier 70' are respectively illustrated. One may appreciate that in FIG. 5D, the output of the present invention is improved with respect to conventional outputs from conventional burst optical receiver.

From the forgoing descriptions, it can be shown that the above objects have been substantially achieved. The present invention provides a burst optical receiver incorporating with an AC coupling network 20 (20') which is capable of enhancing a sensitivity of the burst optical receiver as compared with conventional optical receivers. Moreover, the requirement of high extinction rate as regards to conventional optical signal can be substantially mitigated so as to enhance a widespread application of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A burst optical receiver, comprising:
    an optical signal inlet adapted for receiving a burst optical signal;
    an optical-electrical signal converter electrically connected with said optical signal inlet to transform said burst optical signal into an electric signal;
    an AC coupling network which is electrically communicated with said optical-electrical signal converter, and shifts said baseline of said electric signal to the middle of said electric signal, wherein said AC coupling network comprises a first, a second, and a third high pass single-time-constant (STC) circuitries;
    an integrator positive feedback network which is electrically communicated with said AC coupling network, and recurrently modifies said electric signal from said AC coupling network in such a manner to eliminate distortion introduced by said AC coupling network, and to bring a transfer function of said burst optical receiver into a real variable function; and
    a pre-amplifying network electrically connecting between said optical-electrical signal converter and said AC coupling network and a buffer amplifying network electrically connecting between said AC coupling network and said integrator positive feedback network, wherein said first high pass STC circuitry is electrically connected between said optical-electrical signal converter and said pre-amplifying network to perform AC-coupling before said electric signal is fed into said pre-amplifying network, wherein said second high pass STC circuitry is electrically connected between said pre-amplifying network and said buffer amplifying network, and wherein said third high pass STC circuitry is electrically connected between said pre-amplifying network and said buffer amplifying network, in such a manner that said electric signal from a complementary output of said pre-amplifier is in reverse phase of said electric signal from said integrator positive feedback network.

2. The burst optical receiver, as recited in claim 1, wherein said pre-amplifying network, which comprises a signal pre-amplifier, is to amplify said electric signal as converted from said optical-electrical signal converter to a predetermined current level for AC coupling by said AC coupling network, wherein said buffer amplifying network, which comprises a buffer amplifier, is adapted to limit said big signal of said burst signal packets and amplify said small signal of said burst signal packets before entering into said integrator positive feedback network.

3. A burst optical receiver, comprising:
    an optical signal inlet adapted for receiving a burst optical signal;
    an optical-electrical signal converter electrically connected with said optical signal inlet to transform said burst optical signal into an electric signal;
    an AC coupling network which is electrically communicated with said optical-electrical signal converter, and shifts said baseline of said electric signal to the middle of said electric signal, wherein said AC coupling network comprises a first, a second, and a third high pass single-time-constant (STC) circuitries;
    an integrator positive feedback network which is electrically communicated with said AC coupling network, and recurrently modifies said electric signal from said AC coupling network in such a manner to eliminate distortion introduced by said AC coupling network, and to bring a transfer function said transfer function of said burst optical receiver into a real variable function; and
    a pre-amplifying network electrically connecting between said optical-electrical signal converter and said AC coupling network and a buffer amplifying network electrically connecting between said AC coupling network and said integrator positive feedback network, wherein said first high pass STC circuitry is electrically connected between said optical-electrical signal converter and said pre-amplifying network, and adapted to perform AC-coupling before said electric signal is fed into said pre-amplifying network, wherein said second high pass STC circuitry is electrically connected between said pre-amplifying network and said buffer amplifying network through a regular signal output of said pre-amplifier, wherein said third high pass STC circuitry is electrically connected between said pre-amplifying network and said buffer amplifying network through a complementary signal output of said pre-amplifier, in such a manner that said electric signal from said complementary output is in reverse phase of said electric signal from a positive output.

4. The burst optical receiver, as recited in claim 1, wherein said first high pass STC circuitry comprises a first STC capacitor electrically connected between said optical-electrical signal converter and said pre-amplifying network, and a first resistor electrically connected between said STC capacitor and the power terminal of said burst optical receiver for performing a preliminary AC-coupling of said electric signal before said electric signal is fed into said pre-amplifying network.

5. The burst optical receiver, as recited in claim 4, wherein said second high pass STC circuitry comprises a second STC capacitor electrically connected between said pre-amplifying network and said buffer amplifying network via a positive output of said pre-amplifying network, and a second ground resistor electrically connected between said second STC capacitor, said buffer amplifying network, and a ground terminal of said burst optical receiver.

6. The burst optical receiver, as recited in claim 5, wherein said third high pass STC circuitry comprises a third STC capacitor electrically connected between said pre-amplifying network and said buffer amplifying network via a complementary output of said pre-amplifying network, and a third ground resistor electrically connected between said third STC capacitor, said buffer amplifying network, and a ground terminal of said burst optical receiver.

7. The burst optical receiver, as recited in claim 1, wherein said integrator positive feedback network further comprises a complementary positive feedback adder connecting with said integrator amplifier of said integrator positive feedback network at a complementary output thereof for creating a predetermined complementary transfer function to generate a complementary signal which is in reverse phase of said output from a positive output of said integrator positive feedback network.

8. The burst optical receiver, as recited in claim 6, wherein said integrator positive feedback network further comprises a complementary positive feedback adder connecting with said integrator amplifier of said integrator positive feedback network at a complementary output thereof for creating a predetermined complementary transfer function to generate a complementary signal which is in reverse phase of said output from a positive output of said integrator positive feedback network.

9. The burst optical receiver, as recited in claim 7, wherein said complementary positive feedback adder comprises two feedback resistors electrically connected with said integrator amplifier in such a manner that one of said feedback resistors is electrically connected with a complementary input of said integrator amplifier, whereas another of said feedback resistors is electrically connected to a complementary output of said integrator amplifier for creating said complementary transfer function.

10. The burst optical receiver, as recited in claim 8, wherein said complementary positive feedback adder comprises two feedback resistors electrically connected with said integrator amplifier in such a manner that one of said feedback resistors is electrically connected with a complementary input of said integrator amplifier, whereas another of said feedback resistors is electrically connected to a complementary output of said integrator amplifier for creating said complementary transfer function.

* * * * *